Sheet 1-2 Sheets.

C. Wheeler Jr.

Mower.

No. 971

Reissued Jun. 5, 1860.

Witnesses.
C. Carlen
J. Hirsch

Inventor.
Cyrenus Wheeler Jr.
by Stoughton Atty.

Sheet 2 - 2 Sheets

C. Wheeler Jr.

Mower.

No. 971

Reissued Jun. 5, 1860.

Witnesses:
C. Cohen
J. Hirsch.

Inventor:
Cyrenus Wheeler Jr
Wm Stoughton att.

UNITED STATES PATENT OFFICE.

CYRENUS WHEELER, JR., OF POPLAR RIDGE, NEW YORK.

IMPROVEMENT IN GRAIN AND GRASS HARVESTERS.

Specification forming part of Letters Patent No. 12,367, dated February 6, 1855; Reissue No. 971, dated June 5, 1860.

*To all whom it may concern:*

Be it known that I, CYRENUS WHEELER, Jr., of Poplar Ridge, in the county of Cayuga and State of New York, have invented certain new and useful Improvements in Grain and Grass Harvesters; and I do hereby declare the following to be a full, clear, and exact description of the construction and operation of the same, reference being had to the accompanying drawings, making a part of this specification, in which—

Figure 1:
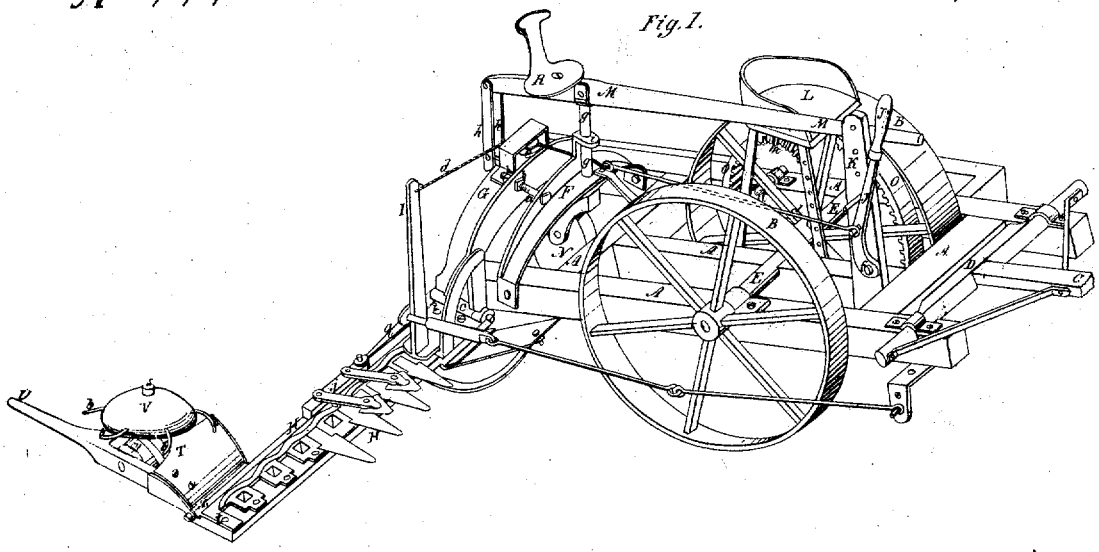
Figure 2:
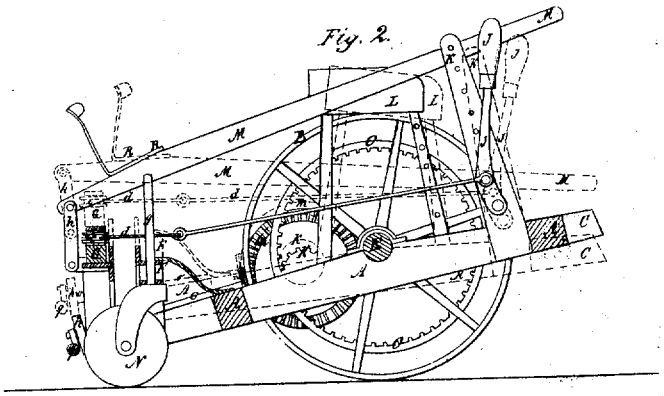

Figure 1 represents in perspective so much of the machine as will show its general arrangement when adjusted for mowing. Fig. 2 represents a vertical longitudinal section through the main frame, and showing by red lines the positions which the elevating devices assume when the rear of the frame and the cutters are raised up for passing obstructions or for cutting at a higher elevation above the ground. Figs. 3, 4, 5, 6, 7, and 8 represent details of the machine, which will be hereinafter specially referred to.

Similar letters of reference, where they occur in the several figures, denote like parts of the machine in all the drawings.

My invention relates to that class of machines known as "combined" machines—that is to say, harvesting-machines capable of cutting grass or grain either, and that can be changed from one to the other purpose conveniently. When cutting grass the machine should follow as closely as possible the undulations of the ground; but when cutting grain it should carry its cutting apparatus above the surface of the ground. To make a machine equally adaptable to both these purposes requires that it should have two properties that would seem inconsistent with each other in one machine—viz., the property of adapting itself to the surface of the ground over which it is passing while cutting grass, in which case the several parts of the machine must have motions independent of each other, and, secondly, the property of being elevated above the ground and held comparatively rigid in such elevated position when cutting grain, but in both conditions to be under the control of the driver or conductor, who from his seat can elevate or depress such portions of the machine as may require it for passing obstructions or for cutting at a greater or less height above the surface of the ground. In changing such a machine to convert it from a grain-cutting to a grass-cutting machine, or vice versa, some of its parts must also be changed; and my invention relates to some of these parts, also, as will be hereinafter set forth, as they perform certain functions important in their particular relations and conditions. Such are the general purposes and objects of my invention. Their specialities will be more fully set forth hereinafter, as well as the several mechanical devices which I have contrived for turning the machine short around at the end of the swath, for strengthening the finger-bar when cutting grain and making it lighter when cutting grass, and for a track-clearer.

My invention consists in so combining a finger-bar with the main frame of a harvesting-machine, and with levers or their equivalent raising or lowing devices extending to within reaching distance of the driver or conductor in his seat, as that said driver or conductor from his seat may raise up either end of the finger or cutter bar independently of the other end, or both ends at once, at pleasure; and my invention further consists in the use of a platform-bar, which, when the table or platform is used, is bolted to the finger-bar, thus giving strength to the finger-bar when the additional weight of the platform is added to it, and when, as in cutting grain, it is subjected to greater strain and removing the platform and its bar when the machine is converted into a mower, in which case the finger-bar may be much lighter, and yet sufficiently strong for its special work as a mower; and my invention further consists in combining with the platform or table a caster-wheel so hung that when the machine is being turned around said caster-wheel will elevate the platform and also the outer end of the finger-bar, and thus prevent them from striking against any projection or being wrenched, strained, or broken, and in connection with the platform caster-wheel, the caster-wheel in the rear end of the main frame when they bear the relative positions they do to the finger-beam and main wheels, as represented; and my invention further consists in a track-clearer that is caused to revolve by gearing, and so located that in backing the machine or in turning it around there will be no danger of breaking or otherwise injuring said track-clearer.

To enable others skilled in the art to make and use my invention, I will proceed to describe the same with reference to the drawings.

A represents the main frame of a harvesting-machine, supported upon two wheels, B B, one of which may be the driving-wheel and the other simply a supporting-wheel. The tongue C of the machine is fastened to a roller, D, which is so connected to the main frame as to freely rock or roll in its supports when the front end of the main frame rises or falls, as it will do when the wheels that carry and support it are passing over gulleys or dead furrows or other inequalities in the ground. The main frame is suspended or supported by the axle E of the two wheels B, so that it shall droop at its rear, and yet be free to rock on said axle, or rise and fall at its rear and front. Toward the rear of the main frame there is an arch or brace piece, F, extending across from side piece to side piece of said main frame, and rigidly attached thereto, so as to be a permanent part of the main frame; and in rear of this permanent arch-piece F there is another arch or brace piece, G, which is hinged or pivoted to the sides of the main frame, so that it can move freely on its pivoted connections when it is desirable to have it do so. A screw-bolt, *a*, with double nuts *b b* passes through the two arch or brace pieces F and G, by means of which a certain extent of motion may be given or allowed to the hinged brace-piece G, or by which it may be made rigid, as exigencies may require.

The finger-bar H is connected to the arch or brace piece G through a hinge-joint, *c*, upon which it may rise and fall freely, or be raised or lowered by the driver or conductor; but as this hinged connection of the finger-bar and main frame forms the subject-matter of other patents granted to me, I do not propose to fully describe them here, nor any further than is necessary to illustrate the operation of this machine.

To the heel of the finger-bar H is affixed an upright, I, to the top of which a cord or chain, *d*, is attached, said cord or chain passing around a pulley, *e*, set on top of the arch or brace piece G, and thence extending either to the lever J or connected with a rod which is attached to said lever and effects the same general purpose. The lever J is pivoted at *f* to a post or upright, K, for convenience, and extends up in close proximity to the driver's or conductor's seat or stand L, so that the occupant of that seat may readily grasp it (the lever) and by bearing upon it raise up the outer end of the finger-bar H. Another lever, M, extends from the seat L rearward, and has for its fulcra the shank *g* of the caster-wheel N, which is placed underneath the arch or brace piece F, and the rear of this lever M is connected by straps or links *h* to the hinged arch or brace piece G. By pressing down the point of the lever M the rear end of the main frame is raised up, the caster-wheel N, resting upon the ground, being the fulcra, its shank *g* freely moving in a hole made in the piece F, but prevented from cramping or twisting by an additional guide-piece, *i*. Thus by means of the levers J and M the outer end alone of the finger-bar may be raised up, or its heel may be raised up and its outer end remain on the ground, or the entire finger-bar and rear of the frame may be raised up or let down, at pleasure. Either end, therefore, of the finger-bar may be raised without raising its other end, or both ends may be raised up together by the driver or conductor from his seat. The upright K is furnished with suitable holes, so that by means of pins placed therein the levers J M may be held to any fixed position desired. When the levers J M are left free, then the parts to which they are connected—viz., the finger-beam and the arch-piece G—are unrestrained by them and move independent of their action; but, when necessary, the levers can be used and released for a temporary lifting, or may be held fast when a permanent elevation is had, though the outside end of the finger-beam can always rise and fall at any time independently of the main frame. The red lines in Fig. 2 show the positions of the several parts of the machine when the levers are put into the positions they are shown in in said figure.

Figure 4:
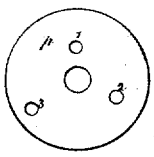

Motion is communicated from the main drive-wheel to the cutter-bar *j* through the gearing *o*, pinion *k*, shaft *l*, bevel-gear *m*, and bevel-pinion *n*, which is on one end of the crank-shaft *o*, the other end of said crank-shaft being furnished with a crank-wheel, *p*, in which, as seen in Fig. 4, there are a series of holes, 1 2 3, at different distances from the center of said wheel, and into either of which the crank-pin may be put as a longer or shorter stroke of the cutter-bar may be desired. To this crank-wheel one end of the pitman *q* is attached, the other end of said pitman being connected to the cutter-bar *j*.

When the machine is to be used for cutting grain a platform or table, P, is used for the cut grain to fall upon; and as greater strength is required in the finger-bar when the machine is arranged for cutting grain, both on account of the additional weight put upon it and the greater difficulty in cutting grain than in cutting grass, I arrange as follows: I connect the platform or table by means of under supports, *r*, to a platform-bar, Q, which, by means of the screw-bolts *s s*, is firmly united to the finger-beam H, said bolts passing through holes *t t* in the finger-beam. Thus, for the additional weight and duty that the finger-bar must withstand, I place an additional strengthening-bar to aid it. When again the machine is to be used for cutting grass, and there is less strain on the finger-bar, the platform and platform-bar are removed together, leaving the finger-bar light and more easily handled and better adapted to accommodate itself to the surface of the ground over which it passes, yet strong enough to resist any ordinary strain that may come upon it in performing this special duty.

It will be perceived that the finger-bar is at the rear end of the main frame, and when the platform or table P is connected to said finger-bar by the platform-bar Q, the platform itself will project its entire length in rear of the main frame, or nearly so, so that the gaveling-space is in rear of the main frame, and the raker's seat R is located as shown, so that the raker may sweep the platform of the cut material and deliver it in a compact gavel in rear of the main frame. A machine so put together might be supposed to be too long to admit of a short turn at the end of the swaths; but such is not the case. This machine can be turned short around and without any backing, the main drive-wheel serving as a pivot around which the whole machine may turn. The supporting-wheel, turning backward, prevents any cramping or undue strain upon the main frame.

Figure 3:
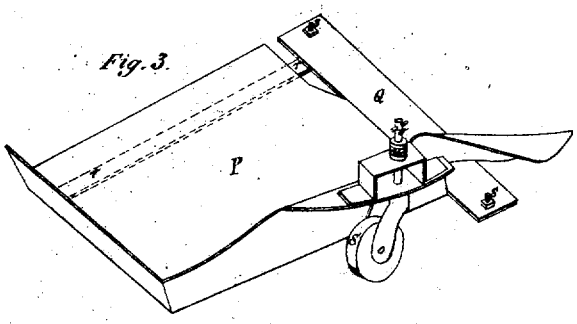
Figure 6:
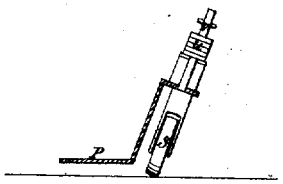
Figure 7:
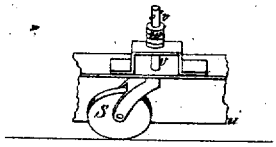
Figure 8:
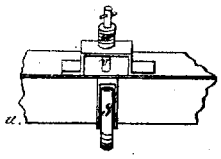

To allow the platform which is at the extreme end of the main frame to come around easily without straining, it requires some additional aid. I effect it as follows: The caster-wheel S, which supports the platform or table, is inclined, as shown at Figs. 3, 6, 7, so that when the machine is drawn forward said wheel will allow the platform to come close to the ground, but not to drag heavily over it. When, however, the machine is to be turned around and the platform must move in the arc of a circle the center of which would be at the point where the main drive-wheel rests upon the ground, it is then important that some facilities should be afforded for so doing with entire safety to the machine and ease to the team. The moment the team is "geed" around and the platform starts in the opposite direction the caster-wheel turns out into the position shown in Fig. 8, and this elevates the platform, as shown by its base-lines *u u*, respectively, in Figs. 7 and 8, as well as places said caster-wheel in the line in which the platform is to move. The caster-wheel N also, by the first swinging movement of the main frame, arranges itself in the line in which the main frame is to move around, and thus the platform and rear end of the main frame become, as it were, a sort of turn-table that will freely move around its center. When the machine is turned around and the team starts ahead the caster-wheels again assume their former positions, the one S allowing the platform to come down close to the ground. I thus make the shortest possible turn at the end of the swath and with ease to the machine and the team. The shank *v* of the caster-wheel S may have upon it a series of washers, *w*, for allowing the platform to be raised or lowered or adjusted upon said shank, as may be found necessary.

Figure 5:
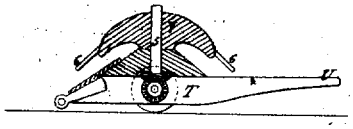

The track-clearer 1 make as follows: Of course it is used only when moving, and when the platform P is not used. T is a stock or frame, hinged at *x* to the rear outside end of the finger-beam H. It is furnished with a lever or handle, U, by which it can be raised up when necessary to do so. In this stock T is set a wheel, *y*, that runs upon the ground, and is turned upon its bearings in so doing. Upon the shaft or journal of this wheel *y* there is arranged, as shown in Fig. 5, a bevel-pinion, *z*, that takes into and turns a bevel-pinion, 4, on a vertical shaft, 5. On this vertical shaft 5 is placed a hub, V, having set into it a series of curved teeth or arms, 6. Now, as this hub revolves through the ground-wheel *y* and gearing *z* 4 its arms 6 catch and throw the cut grass away from the standing grass, and thus form a clear track for the machine on its next round.

I know that a revolving track-clearer has heretofore been used; but it was revolved by its own friction upon the ground, and when the machine was backed or turned around the track-clearer had first to be lifted up and held up until the machine was turned around, this operation being quite troublesome. My track-clearer is so arranged that it is revolved freely, but is not endangered in backing or turning; neither need it be raised or held up when so turning around or backing the machine; besides, it relieves the driver or conductor of any care or attention while he is backing or turning around.

It is obvious that the extent of the raising of either end or of both ends of the finger-bar may be discretionary with the operator, or such as will effect the special purpose for which the raising need to be done. So, too, with regard to how much or how little of the weight of the main frame or of the finger-bar shall be on the ground, for this can be regulated in a measure by the caster-wheel N.

It is also obvious that modifications of the machine may be made without departing from the principles which characterize the invention.

Having thus fully described the nature and object of my invention, what I claim is—

1. So combining a hinged finger-bar and main frame with levers, substantially as described, extending toward the driver's or conductor's seat as that the occupant of said seat can without leaving his position raise up either end of the finger-bar independently of its other end, or raise up both ends thereof, at pleasure, substantially as described.

2. The platform-bar Q as a means of securing the platform to the finger-beam and for strengthening said finger-beam when it has the platform to carry, substantially as described.

3. The inclined caster-wheel S, arranged as represented, and in combination with the platform, whereby the latter is elevated when the machine is being turned short around to the right, substantially as described.

4. In combination with a finger-beam and platform placed in rear of the main supporting-wheel, the two casters N S, arranged as described, for allowing the machine to turn short around to the right, for the purposes specified.

5. A revolving track-clearer when operated from a ground-wheel through gearing, substantially as described.

CYRENUS WHEELER, JR.

Witnesses:
ALFRED LYON,
JOHN R. WETSELL.